(12) United States Patent
Matsumoto

(10) Patent No.: US 11,943,412 B2
(45) Date of Patent: **\*Mar. 26, 2024**

(54) SHEET DISCHARGING APPARATUS, IMAGE READING APPARATUS, AND IMAGE FORMING APPARATUS

(71) Applicant: CANON KABUSHIKI KAISHA, Tokyo (JP)

(72) Inventor: Akira Matsumoto, Toride (JP)

(73) Assignee: CANON KABUSHIKI KAISHA, Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 18/104,808

(22) Filed: Feb. 2, 2023

(65) Prior Publication Data

US 2023/0216971 A1 Jul. 6, 2023

Related U.S. Application Data

(63) Continuation of application No. 17/825,039, filed on May 26, 2022, now Pat. No. 11,595,541, which is a
(Continued)

(30) Foreign Application Priority Data

May 31, 2019 (JP) .................................. 2019-102798

(51) Int. Cl.
*H04N 1/12* (2006.01)
*B65H 31/00* (2006.01)
(Continued)

(52) U.S. Cl.
CPC ............. *H04N 1/121* (2013.01); *B65H 31/00* (2013.01); *G03G 15/607* (2013.01); *H04N 1/00554* (2013.01); *B65H 2404/63* (2013.01)

(58) Field of Classification Search
CPC ........................ B65H 2220/01; B65H 31/02; B65H 2801/06; B65H 2801/27; B65H 2220/02;
(Continued)

(56) References Cited

U.S. PATENT DOCUMENTS 6,196,827 B1    3/2001  Pottorff
6,601,846 B2 \*  8/2003  Saito ..................... B65H 37/04
                                                                271/226
(Continued)

FOREIGN PATENT DOCUMENTS

JP    H06-56328 A     3/1994
JP    2006-027758 A   2/2006
(Continued)

OTHER PUBLICATIONS

Japanese Office Action dated Apr. 11, 2023, in related Japanese Patent Application No. 2019-102798.

*Primary Examiner* — Negussie Worku
(74) *Attorney, Agent, or Firm* — VENABLE LLP

(57) ABSTRACT

An image forming apparatus includes an image forming portion to form an image on a sheet, a tray on which sheets to be fed are stacked, and a swing member supported by the tray and configured to swing in a case where the swing member is pushed by a discharged sheet. A stacking portion includes a first surface on an upper portion of a first portion, and a moving member in contact with the discharged sheet. The moving member can be positioned at a position downstream of the first surface in the discharge direction, wherein the swing member overlaps with the first surface as viewed in the sheet width direction in a case where the swing member is not in contact with a discharged sheet, and the swing member is arranged such that a lower end of the swing member is not in contact with the stacking portion.

20 Claims, 11 Drawing Sheets

Related U.S. Application Data continuation of application No. 16/881,207, filed on May 22, 2020, now Pat. No. 11,368,597.

(51) Int. Cl.
  *G03G 15/00* (2006.01)
  *H04N 1/00* (2006.01)

(58) Field of Classification Search
  CPC ........ B65H 2220/11; B65H 2301/4212; B65H 2405/11151; B65H 29/14; B65H 31/20; B65H 31/3027; B65H 1/04; B65H 2301/4213; B65H 2404/1521; B65H 2405/11164; B65H 2511/51; B65H 2513/10; B65H 2801/39; B65H 31/24; B65H 5/062; B65H 5/36; B65H 2220/03; B65H 2301/33312; B65H 2301/42262; B65H 2301/42266; B65H 2403/514; B65H 2404/6111; B65H 2404/721; B65H 2405/1111; B65H 2405/1116; B65H 2405/11162; B65H 2405/1124; B65H 2405/1412; B65H 2405/324; B65H 2405/3321; B65H 2408/122; B65H 2511/11; B65H 2511/15; B65H 2513/512; B65H 2515/10; B65H 2553/61; B65H 2601/11; B65H 2601/26; B65H 29/51; B65H 29/52; B65H 31/10; B65H 31/22; B65H 31/3081; B65H 33/08; B65H 39/10; B65H 43/00; B65H 43/06; B65H 43/08; B65H 5/38; B65H 2220/04; B65H 2301/16; B65H 2301/163; B65H 2301/42192; B65H 2301/43828; B65H 2301/51616; B65H 2402/10; B65H 2402/30; B65H 2402/32; B65H 2402/54; B65H 2403/51; B65H 2403/945; B65H 2404/1442; B65H 2404/531; B65H 2404/5311; B65H 2404/5521; B65H 2404/611; B65H 2404/64; B65H 2404/65; B65H 2405/1117; B65H 2405/15; B65H 2405/332; B65H 2407/20; B65H 2407/21; B65H 2511/10; B65H 2511/20; B65H 2511/30; B65H 2511/414; B65H 2511/515; B65H 2513/40; B65H 2553/412; B65H 2555/13; B65H 2601/25; B65H 2601/321; B65H 2601/324; B65H 2601/325; B65H 2601/423; B65H 2601/521; B65H 2601/522; B65H 2701/182; B65H 2701/18292; B65H 29/22; B65H 29/58; B65H 29/60; B65H 29/68; B65H 3/0669; B65H 3/0684; B65H 3/5223; B65H 3/54; B65H 3/66; B65H 3/68; B65H 31/18; B65H 33/00; B65H 37/04; B65H 43/02; B65H 5/068; B65H 7/02; B65H 7/14; B65H 7/20; B65H 85/00; B65H 9/006; H04N 1/0062; H04N 1/121; H04N 1/00554; H04N 1/00631; H04N 1/00559; H04N 1/00572; H04N 1/00578; H04N 1/0058; H04N 1/00588; H04N 1/00604; H04N 1/00615; H04N 2201/0081; H04N 1/00206; H04N 1/00596; H04N 1/0066; H04N 1/00795; H04N 1/00801; H04N 1/00822; H04N 1/02835; H04N 1/12; H04N 1/193; H04N 1/21; G03G 15/6538; G03G 15/60; G03G 15/605; G03G 15/6552; G03G 15/6573; G03G 15/00; G03G 15/04072; G03G 15/161; G03G 15/5029; G03G 15/607; G03G 15/6514; G03G 15/6529; G03G 15/6541; G03G 15/6544; G03G 21/1604; G03G 21/1642; G03G 21/1647; G03G 21/1814; G03G 21/1821; G03G 21/1842; G03G 21/1853; G03G 21/186; G03G 2215/00236; G03G 2215/0043; G03G 2215/00628; G03G 2215/00721; G03G 2215/00725; G03G 2215/00852
  USPC .......................................................... 358/498
  See application file for complete search history.

(56) References Cited

U.S. PATENT DOCUMENTS

| | | | |
|---|---|---|---|
| 6,648,320 | B2 | 11/2003 | Iino et al. |
| 7,623,277 | B2 | 11/2009 | Wang et al. |
| 7,748,705 | B2 | 7/2010 | Yamada |
| 8,185,039 | B2 | 5/2012 | Kato et al. |
| 8,837,019 | B2 | 9/2014 | Matsumoto |
| 9,162,840 | B1* | 10/2015 | Ohta ..................... B65H 29/70 |
| 9,744,740 | B2 | 8/2017 | Abe |
| 9,932,194 | B2 | 4/2018 | Tokuma |
| 10,440,214 | B2 | 10/2019 | Ogasawara |
| 10,459,402 | B2 | 10/2019 | Kashiide |
| 11,192,745 | B2 | 12/2021 | Matsumoto |
| 11,247,860 | B2 | 2/2022 | Yamada |
| 11,316,994 | B2* | 4/2022 | Matsumoto ............ B65H 31/20 |
| 11,368,597 | B2* | 6/2022 | Matsumoto ............ H04N 1/121 |
| 11,595,541 | B2* | 2/2023 | Matsumoto .......... G03G 15/607 |
| 2004/0181309 | A1 | 9/2004 | Matsumoto et al. |
| 2006/0103068 | A1 | 5/2006 | Sekiya |
| 2008/0193181 | A1 | 8/2008 | Jeong et al. |
| 2008/0290576 | A1 | 11/2008 | Kato et al. |
| 2015/0008641 | A1 | 1/2015 | Ko et al. |
| 2016/0251175 | A1 | 9/2016 | Kurokawa |
| 2017/0050811 | A1 | 2/2017 | Tateishi |
| 2017/0213630 | A1 | 7/2017 | Maruyama |
| 2018/0179010 | A1 | 6/2018 | Nakamura |
| 2018/0297802 | A1 | 10/2018 | Ishida et al. |
| 2018/0352101 | A1 | 12/2018 | Takizawa et al. |
| 2019/0233230 | A1* | 8/2019 | Ichikawa ............. B65H 3/0684 |
| 2020/0122951 | A1* | 4/2020 | Noda .................... B65H 31/24 |
| 2020/0220090 | A1 | 7/2020 | Chen et al. |
| 2020/0270090 | A1* | 8/2020 | Matsumoto .............. B65H 1/04 |
| 2020/0382668 | A1* | 12/2020 | Matsumoto ........ H04N 1/00631 |
| 2020/0382674 | A1 | 12/2020 | Matsumoto |
| 2021/0006679 | A1* | 1/2021 | Hasegawa .......... G03G 21/1604 |
| 2022/0043384 | A1* | 2/2022 | Yamada ................. B65H 31/24 |
| 2022/0286575 | A1* | 9/2022 | Matsumoto ........ H04N 1/00554 |
| 2023/0278306 | A1* | 9/2023 | Miyamoto .............. B31B 70/52 |
| | | | 493/416 |

FOREIGN PATENT DOCUMENTS

| | | |
|---|---|---|
| JP | 2006-089201 A | 4/2006 |
| JP | 2015-009978 A | 1/2015 |
| JP | 2016-005983 A | 1/2016 |
| JP | 2018-064156 A | 4/2018 |

* cited by examiner

SHEET DISCHARGING APPARATUS, IMAGE READING APPARATUS, AND IMAGE FORMING APPARATUS

This application is a continuation of application Ser. No. 17/825,039, filed May 26, 2022, which is a continuation of application Ser. No. 16/881,207, filed May 22, 2020, now U.S. Pat. No. 11,368,597, issued Jun. 21, 2022.

BACKGROUND OF THE INVENTION

Field of the Invention

The present invention relates to a sheet discharging apparatus that discharges a sheet, an image reading apparatus that reads image information from a sheet, and an image forming apparatus that forms an image on a sheet.

Description of the Related Art

An image reading apparatus incorporated in an image forming apparatus such as a copier or a multifunctional apparatus includes an auto document feeder (ADF) that automatically feeds one sheet at a time serving as a document. A sheet fed by the ADF is supported on a discharge tray after image information thereof is read by an image sensor.

In recent years, there has been a demand for automatically feeding sheets of various sizes by an ADF and reading image information. According to this, there has been a demand that sheets stacked on a discharge tray are precisely aligned also in the case of feeding sheets of different kinds having different lengths in a conveyance direction by the ADF. Japanese Patent Laid-Open No. 2018-64156 discloses a configuration in which an inclined surface inclined such that a more downstream portion thereof in a sheet discharge direction extends more upward is provided on a discharge tray.

However, it is sometimes difficult to maintain good alignment of sheets of a plurality of sizes even in the case where the inclined surface described in the document above is provided.

SUMMARY OF THE INVENTION

The present invention provides a sheet discharging apparatus, an image reading apparatus and an image forming apparatus that can achieve good alignment of sheets of various sizes.

According to one aspect of the invention, a sheet discharging apparatus includes: a discharge unit configured to discharge a sheet in a discharge direction; a stacking portion on which sheets discharged by the discharge unit are stacked; and a swing guide configured to swing about a swing shaft positioned above the stacking portion. The stacking portion includes: an upstream supporting portion configured to support a sheet discharged from the discharge unit; a wall surface portion erecting upward from an upstream end of the upstream supporting portion in the discharge direction; a first supporting portion provided downstream of the upstream supporting portion in the discharge direction and including a first inclined surface inclined upward toward a downstream side in the discharge direction; and a second supporting portion provided downstream of the upstream supporting portion in the discharge direction and including a second inclined surface inclined upward toward the downstream side in the discharge direction. The swing guide is configured to overlap with the first supporting portion as viewed in a width direction of a sheet perpendicular to the discharge direction in a case where the swing guide is not in contact with a sheet discharged by the discharge unit, and swing upward in a case where the swing guide is pushed by a sheet. As viewed in the width direction, the stacking portion is configured to satisfy L1<L2, L4<L2, H1<H2, and H4<H2, where L1 represents a distance from a first intersection point to a first vertex in a horizontal direction, the first intersection point being an intersection point where the wall surface portion and the upstream supporting portion intersect, the first vertex being a highest point of the first inclined surface in a gravity direction, H1 represents a distance from the first intersection point to the first vertex in the gravity direction, L2 represents a distance from the first intersection point to a second vertex in a horizontal direction, the second vertex being a highest point of the second inclined surface in the gravity direction, H2 represents a distance from the first intersection point to the second vertex in the gravity direction, L4 represents a distance from the first intersection point to a second intersection point in the horizontal direction, the second intersection point being an intersection point where the swing guide and the first inclined surface of the first supporting portion intersect, and H4 represents a distance from the first intersection point to the second intersection point in the gravity direction.

According to another aspect of the invention, a sheet discharging apparatus includes: a discharge unit configured to discharge a sheet in a discharge direction; a swing guide configured to swing about a swing shaft; an upstream supporting portion configured to support a sheet discharged from the discharge unit; a wall surface portion erecting upward from an upstream end of the upstream supporting portion in the discharge direction; a first supporting portion provided downstream of the upstream supporting portion in the discharge direction and including a first inclined surface inclined upward toward a downstream side in the discharge direction; and a second supporting portion provided downstream of the upstream supporting portion in the discharge direction and including a second inclined surface inclined upward toward the downstream side in the discharge direction. The swing guide overlaps with the first inclined surface of the first supporting portion as viewed in a width direction of a sheet perpendicular to the discharge direction in a case where the swing guide is not in contact with a sheet discharged by the discharge unit. The swing guide swings upward in a case where the swing guide is pushed by a sheet. A highest point of the second inclined surface is downstream of a highest point of the first inclined surface in the discharge direction. The highest point of the second inclined surface is higher than the highest point of the first inclined surface.

Further features of the present invention will become apparent from the following description of exemplary embodiments with reference to the attached drawings.

DESCRIPTION OF THE EMBODIMENTS

An exemplary embodiment of the present invention will be described below with reference to drawings.

Figure 1:
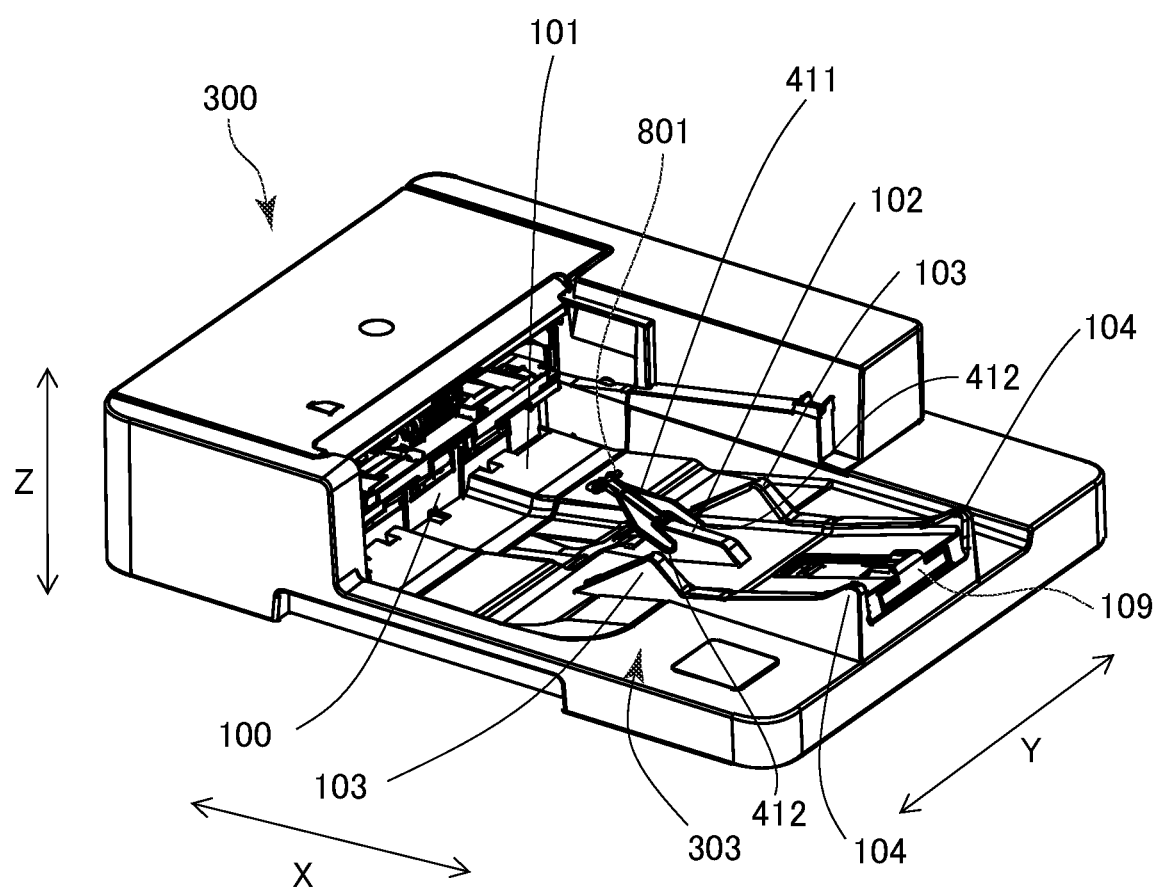
FIG. 1 is a perspective view of a discharge tray of an ADF according to an exemplary embodiment.
Figure 2:
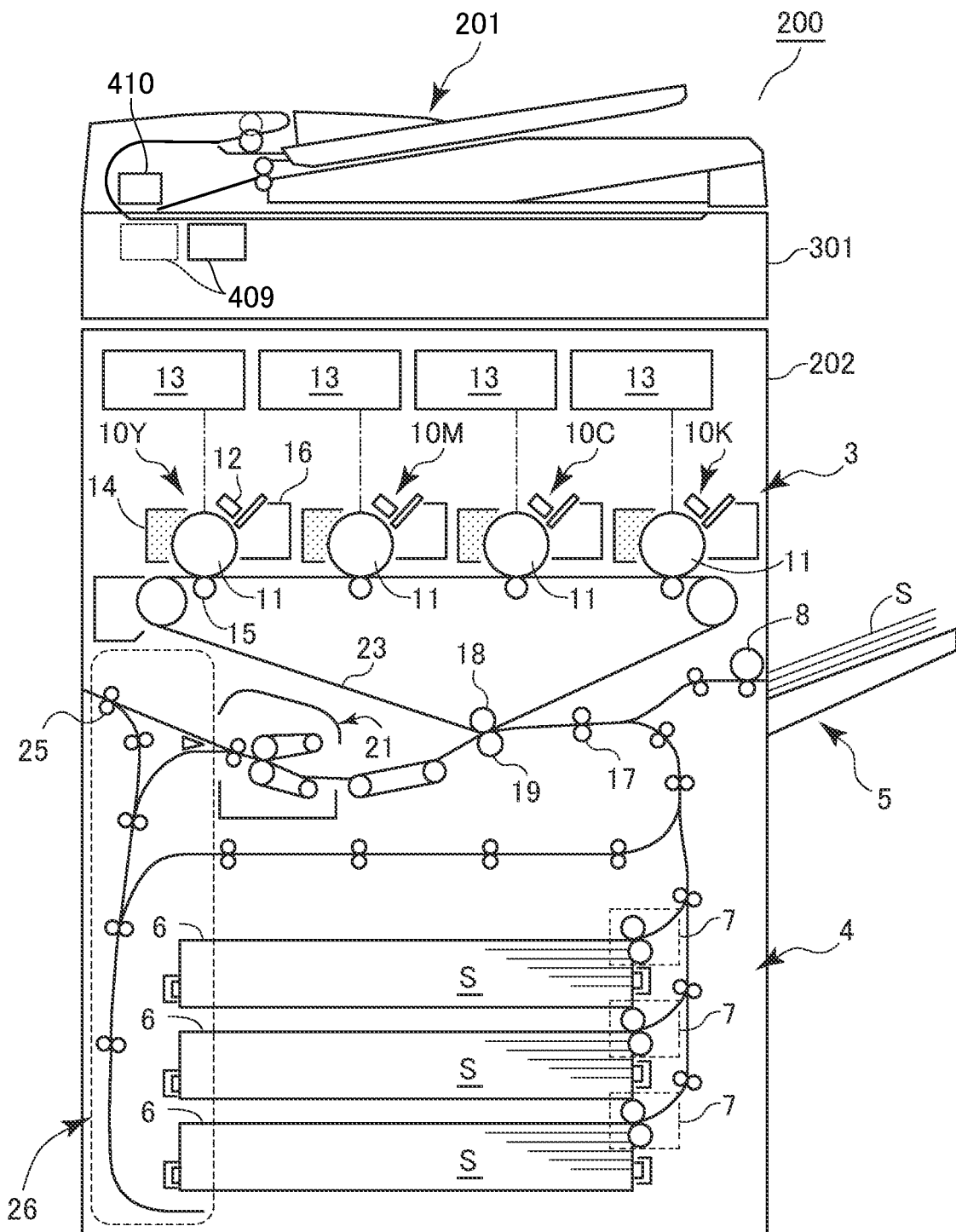
FIG. 2 is a diagram schematically illustrating an image forming apparatus according to the exemplary embodiment.
Figure 3:
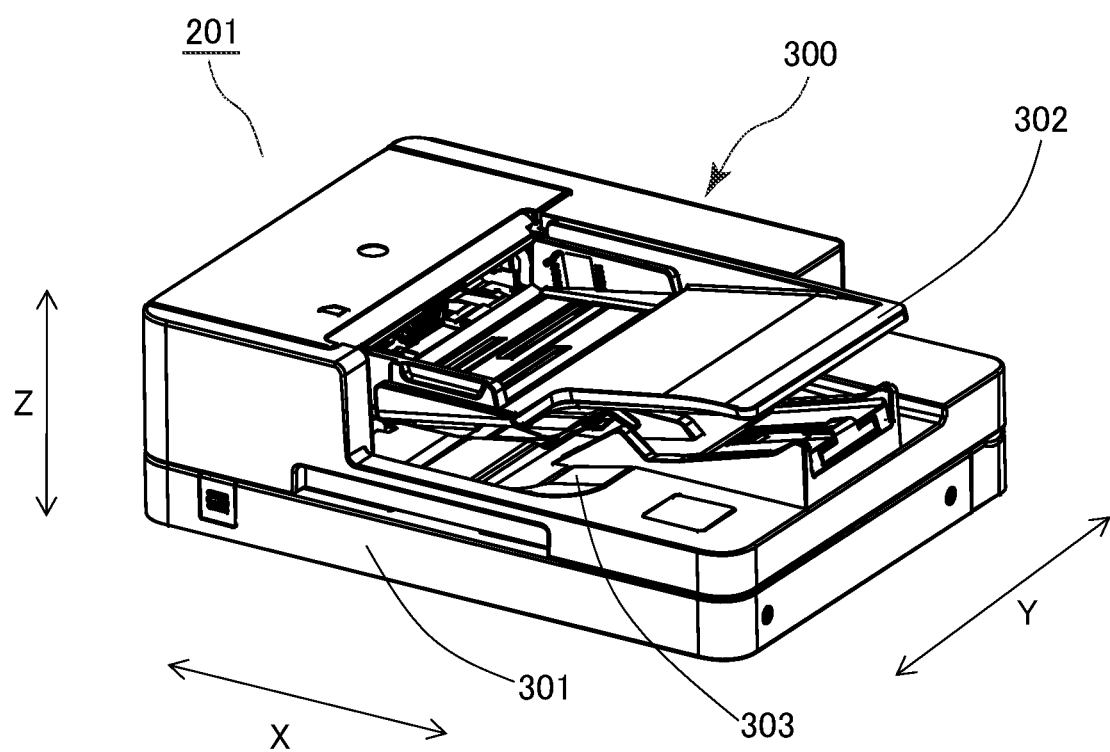
FIG. 3 is a diagram schematically illustrating an image reading apparatus according to the exemplary embodiment.
Figure 4:
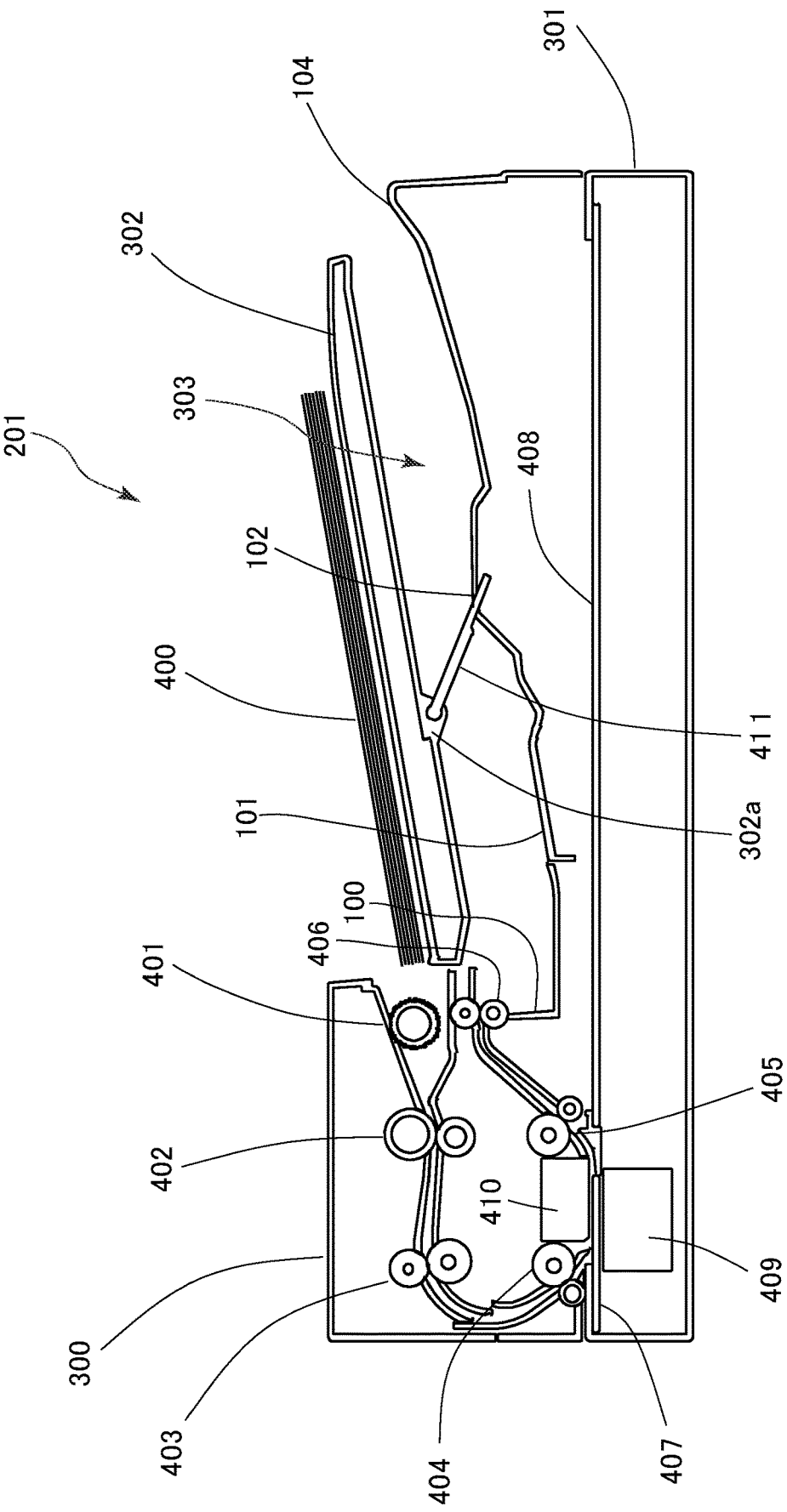
FIG. 4 is a section view of the image reading apparatus according to the exemplary embodiment.

FIG. 1 is a perspective view of an ADF 300 according to an exemplary embodiment of the present disclosure. To be noted, in FIG. 1, illustration of a feed tray is omitted such that a discharge tray 303 is visible. FIG. 2 is a schematic view of an image forming apparatus 200 including an image reading apparatus 201. FIG. 3 is a schematic view of the ADF 300 and a reader portion 301 constituting the image reading apparatus 201. FIG. 4 is a diagram illustrating a sectional configuration of the image reading apparatus 201.

Image Forming Apparatus

First, a schematic configuration of the image forming apparatus 200 of an electrophotographic system including the image reading apparatus 201 will be described with reference to FIG. 2. To be noted, the image forming apparatus 200 is merely an example of an image forming apparatus, and examples of image forming apparatus to which the technique of the present disclosure is applicable include facsimile apparatuses and multifunctional apparatuses including the image reading apparatus 201. In addition, an image forming unit incorporated in the image forming apparatus is not limited to an electrophotographic system, and the image forming apparatus may include, for example, a printing unit of an inkjet system.

As illustrated in FIG. 2, the image forming apparatus 200 includes an image forming apparatus body 202 and the image reading apparatus 201 mounted on an upper portion of the image forming apparatus body 202. The image forming apparatus body 202 includes an image forming portion 3 serving as an image forming unit disposed approximately at the center thereof, and a feeding unit for feeding a recording material S including feed cassettes 6 is positioned below the image forming portion 3. As the recording material S, a wide variety of sheets of different sizes and materials such as paper sheets like regular paper sheets and cardboards, plastic films, cloths, surface-treated sheet materials such as coated paper, and sheet materials having irregular shapes such as envelopes and index sheets can be used. The image reading apparatus 201 including image sensors 409 and 410 serving as image reading units for reading an image of a document is provided above the image forming apparatus body 202.

In the image forming apparatus body 202, the image forming portion 3 is configured as a print engine of an electrophotographic system. The image forming portion 3 of the present exemplary embodiment is configured as a tandem type intermediate transfer system, and includes four image forming units 10Y, 10M, 10C, and 10K and an intermediate transfer belt 23 serving as an intermediate transfer member.

The image forming unit 10Y forms a yellow toner image by an electrophotographic process. That is, a photosensitive drum 11 serving as a photosensitive member rotates, and a charging device 12 uniformly charges the surface of the photosensitive drum 11. A laser scanner 13 irradiates the photosensitive drum 11 with laser light modulated on the basis of image information, and thus draws an electrostatic latent image on the surface of the photosensitive drum 11. A developing unit 14 supplies charged toner particles to the photosensitive drum 11, and thus develops the electrostatic latent image on the surface of the photosensitive drum 11 into a toner image. This toner image is transferred onto the intermediate transfer belt 23 through primary transfer by a primary transfer roller 15. Attached matter such as transfer residual toner remaining on the photosensitive drum 11 without being transferred onto the intermediate transfer belt 23 is removed by a drum cleaner 16. The process described above is performed in parallel by each of the image forming units 10Y to 10K, and toner images of respective colors of yellow, magenta, cyan, and black are formed.

The intermediate transfer belt 23 is rolled around a plurality of rollers including a secondary transfer inner roller 18, and is rotationally driven in a direction following a rotation direction of photosensitive drums 11, that is, a clockwise direction in FIG. 2. Toner images of respective colors formed by the image forming units 10Y to 10K are transferred through primary transfer so as to be superimposed on one another, and thus a full-color toner image is formed on the intermediate transfer belt 23. This toner image is conveyed to a secondary transfer portion formed between the secondary transfer inner roller 18 and a secondary transfer roller 19 opposed thereto by the rotation of the intermediate transfer belt 23.

The image forming apparatus 200 includes a cassette feeding portion 4 and a manual feeding portion 5 as sheet feeding apparatuses for feeding the recording material S. The cassette feeding portion 4 includes the plurality of feed cassettes 6, and the feeding unit 7 feeds the recording material S one by one from one of the feed cassettes 6 toward a registration roller 17. In addition, the manual feeding portion 5 provided on a side portion of the apparatus body 202 feeds the recording material S one by one by a feeding unit 8 toward the registration roller 17. The feeding units 7 and 8 each include a feeding member such as a feed roller that delivers out the recording material S from a feed cassette 6 or a manual feed tray, and a separation member such as a separation roller or a separation pad that applies a frictional force to a sheet of the recording material S superimposed on another sheet of the recording material S conveyed by the feeding member to prevent multiple sheets of the recording material S from being conveyed simultaneously.

The registration roller 17 delivers the recording material S into the secondary transfer portion in synchronization with the formation of the toner image by the image forming portion 3. The recording material S on which the toner image has been transferred from the intermediate transfer belt 23 through secondary transfer in the secondary transfer portion is conveyed to a fixing unit 21. The fixing unit 21 applies heat and pressure to the toner image on the recording material S while nipping and conveying the recording material S, and thus fixes the toner image to the recording material S. In the case of duplex printing, the recording material S having passed through the fixing unit 21 is guided to a reverse conveyance path 26, switched back, and conveyed to the image forming portion 3 in a state in which a first surface and a second surface thereof are reversed, and an image is formed on the second surface of the recording material S. In the case of simplex printing and in the case where image formation on the second surface in the duplex printing is finished, the recording material S having passed through the fixing unit 21 is discharged from the apparatus body 202 by a discharge roller 25.

To be noted, FIG. 2 illustrates a configuration in which the recording material S on which an image has been formed is discharged onto a discharge tray disposed on a side surface of the image forming apparatus body 202 or onto a sheet processing apparatus connected to the image forming apparatus body 202. Instead of this, a so-called in-body discharge configuration in which a space is provided between the image reading apparatus 201 and the image forming apparatus body 202 in the gravity direction to form a body discharge portion onto which a recording material having undergone image formation in the image forming apparatus body 202 is discharged may be employed.

Image Reading Apparatus

Next, a schematic configuration of the ADF 300 and the reader portion 301 constituting the image reading apparatus 201 will be described with reference to FIG. 3.

As illustrated in FIG. 3, the image reading apparatus 201 includes the ADF 300 that feeds a plurality of documents one by one by separating one document from another for reading an image on the document by an image sensor while conveying the document. As the document, a wide variety of sheets of different sizes and materials such as paper sheets like regular paper sheets and cardboards, plastic films, cloths, sheet materials whose surface is treated such as coated paper, and sheet materials having irregular shapes such as envelopes and index sheets can be used. In particular, in the present exemplary embodiment, sheets of a small size that are conventionally hardly handled by an ADF, for example, business cards, can be conveyed by the ADF 300.

The ADF 300 includes a feed tray 302 on which documents are placed, and a discharge tray 303 serving as a stacking portion onto which documents whose images have been read are discharged and on which the discharged documents are stacked. The reader portion 301 for reading an image of a document conveyed by the ADF 300 or an image of a still document, for example, a thick document such as a book, is provided below the ADF 300.

In the description below, as illustrated in FIG. 3, the left-right direction of the image reading apparatus 201 as viewed from a user, that is, as viewed from the front side of the image forming apparatus 200, will be referred to as an X direction. The front-rear direction of the image reading apparatus 201 perpendicular to the X direction, that is, the main scanning direction or width direction of documents, will be referred to as a Y direction. In addition, the up-down direction of the image reading apparatus 201 perpendicular to both of the X direction and the Y direction, that is, the gravity direction in normal use, will be referred to as a Z direction. The ADF 300 feeds a document placed on the feed tray 302 toward one side in the X direction, and discharges the document toward the other side in the X direction, that is, in a sheet discharge direction of the present exemplary embodiment, onto the discharge tray 303.

Next, the inner structure of the image reading apparatus 201 will be described with reference to FIG. 4, which is a section view of the image reading apparatus 201 as viewed in the Y direction. The ADF 300 includes a pickup roller 401, a separation roller pair 402, and a plurality of roller pairs 403 to 406 as a plurality of conveyance units that convey a sheet. The pickup roller 401 abuts the uppermost document among documents 400 placed on the feed tray 302, and sends out the uppermost document toward the separation roller pair 402. The separation roller pair 402 separates one document 400 from a plurality of documents 400 when a plurality of documents 400 are received from the pickup roller 401, and conveys the separated document 400.

The plurality of conveyance roller pairs convey the document 400 through a reading position while passing the document 400 onto one another. In this case, the reading position is a position where the image sensors 409 and 410 scan the document 400. Among these conveyance roller pairs, a pulling roller pair 403 conveys the document 400 while pulling out the document 400 from the separation roller pair 402. A first reading roller pair 404 and a second reading roller pair 405 convey the document 400 such that the document 400 passes through the reading position while stabilizing the position of the document 400 at the reading position so as to improve the reading precision. A discharge roller pair 406 receives the document 400 having passed through the reading position and discharges the document 400 onto the discharge tray 303.

A swing guide 411 is swingably supported on a lower portion of the feed tray 302 disposed above the discharge tray 303. The swing guide 411 has a function of applying a resistance force to the document 400 discharged by the discharge roller pair 406 to restrict excessive movement of the document 400 in the discharge direction, which is rightward in FIG. 4. To be noted, the swing guide 411 may be urged downward by the weight thereof, or may be, for example, urged downward by a spring member attached to a swing shaft 801.

The image sensor 409 serving as a first reading unit is provided in the reader portion 301. When reading an image from a first surface of the document 400 conveyed by the ADF 300, the image sensor 409 stops at a position where the image sensor 409 opposes a document feeding-reading glass 407, that is, at a position illustrated in FIG. 4. When reading an image from a still document placed on a platen glass 408, the image sensor 409 reads the image while moving on a rail provided in the reader portion 301 in the X direction, which is a sub-scanning direction.

Further, an image sensor 410 serving as a second reading unit is provided in the ADF 300 at a position opposing the image sensor 409 of the reader portion 301. Therefore, images on both surfaces of the document 400 conveyed by the ADF 300 can be simultaneously read by using the two image sensors 409 and 410. To be noted, as the image sensors 409 and 410, a contact image sensor: CIS, which is a module of an image sensor such as a complementary metal oxide semiconductor: CMOS and an equal-magnification optical system, and a CCD-type image sensor in which a charge-coupled device: CCD and a reduced optical system are combined can be both used.

As described above, the ADF 300 serving as a sheet discharging apparatus of the present exemplary embodiment has a function of discharging a document whose image has been read onto the discharge tray 303 by the discharge roller pair 406 serving as a discharge unit.

Discharge Tray

Next, a schematic configuration of the discharge tray 303 will be described with reference to FIGS. 1 to 4. The discharge tray 303 includes a wall surface portion 100, an upstream supporting surface 101, a first projection 102, second projections 103, and third projections 104.

The wall surface portion 100 is erected, i.e., extends upward in the Z direction, from an upstream end of the discharge tray 303 in the discharge direction. The upstream supporting surface 101 serving as an upstream supporting portion of the present exemplary embodiment extends downstream with respect to the wall surface portion 100 in the discharge direction of documents by the discharge roller pair 406, that is, in the X direction.

The first projection 102 serving as a first supporting portion of the present exemplary embodiment is provided downstream of the upstream supporting surface 101 in the discharge direction, and projects upward in the Z direction with respect to the upstream supporting surface 101. The single first projection 102 is provided at an approximately center position of the discharge tray 303 in the Y direction.

The second projections 103 serving as second supporting portions of the present exemplary embodiment are disposed such that the first projection 102 is interposed therebetween in the Y direction, and have shapes projecting upward in the Z direction as viewed in the Y direction. The third projections 104 serving as third supporting portions of the present exemplary embodiment are also disposed such that the first projection 102 is interposed therebetween in the Y direction, and have shapes projecting upward in the Z direction as viewed in the Y direction.

The second projection 103 and the third projection 104 on one side (front side of the image reading apparatus) in the Y direction are connected in the X direction to make up a rib-like projection on the upper surface of the discharge tray 303. Similarly, the second projection 103 and the third projection 104 on the other side (rear side of the image reading apparatus) in the Y direction are also connected in the X direction to make up a rib-like projection on the upper surface of the discharge tray 303.

The arrangement of the first supporting portion, the second supporting portions, and the third supporting portions in the Y direction can be appropriately modified. For example, a plurality of first projections 102 may be provided at a plurality of positions in the Y direction. In addition, two second projections 103 and/or two third projections 104 may be disposed on each side of the center position of the discharge tray 303 in the Y direction, that is, four second projections 103 and/or four third projections 104 may be provided in total.

The swing guide 411 is provided at a position corresponding to the first projection 102 in the X direction and the Y direction in a space between the feed tray 302 and the discharge tray 303. The swing guide 411 is supported by a bearing portion 302a of the feed tray 302 positioned above the discharge tray 303 so as to be swingable about the swing shaft 801 extending in the Y direction. Distal end portions 412 of the swing guide 411 on the side farther from the swing shaft 801 have a shape branched into two portions in the Y direction, and are disposed such that the first projection 102 is interposed between one branch to a first side in the Y direction and the other branch to a second side in the Y direction of the branched shape. Therefore, in a state in which a document is not discharged onto the discharge tray 303 and the swing guide 411 dangles due to its own weight, the distal end portions of the swing guide 411 overlap with the first projection 102 as viewed in the Y direction as illustrated in FIGS. 1 and 4. In addition, the distal end portions 412 of the swing guide 411 are respectively positioned between the first projection 102 and the second projection 103 on the one side (first side) in the Y direction, i.e., a first projected portion of the second supporting portion, and between the first projection 102 and the second projection 103 on the other side (second side) in the Y direction, i.e., a second projected portion of the second supporting portion.

To be noted, although only one first projection 102 and one swing guide 411 are provided in the present exemplary embodiment, a plurality of first projections 102 and/or a plurality of swing guides 411 may be provided at a plurality of positions in the Y direction. In this case, the number of the first projections 102 and the number of the swing guides 411 do not have to be equal, and for example, the number of the swing guides 411 may be smaller than the number of the first projections 102.

Shape of Discharge Tray and Position of Swing Guide

Figure 5:
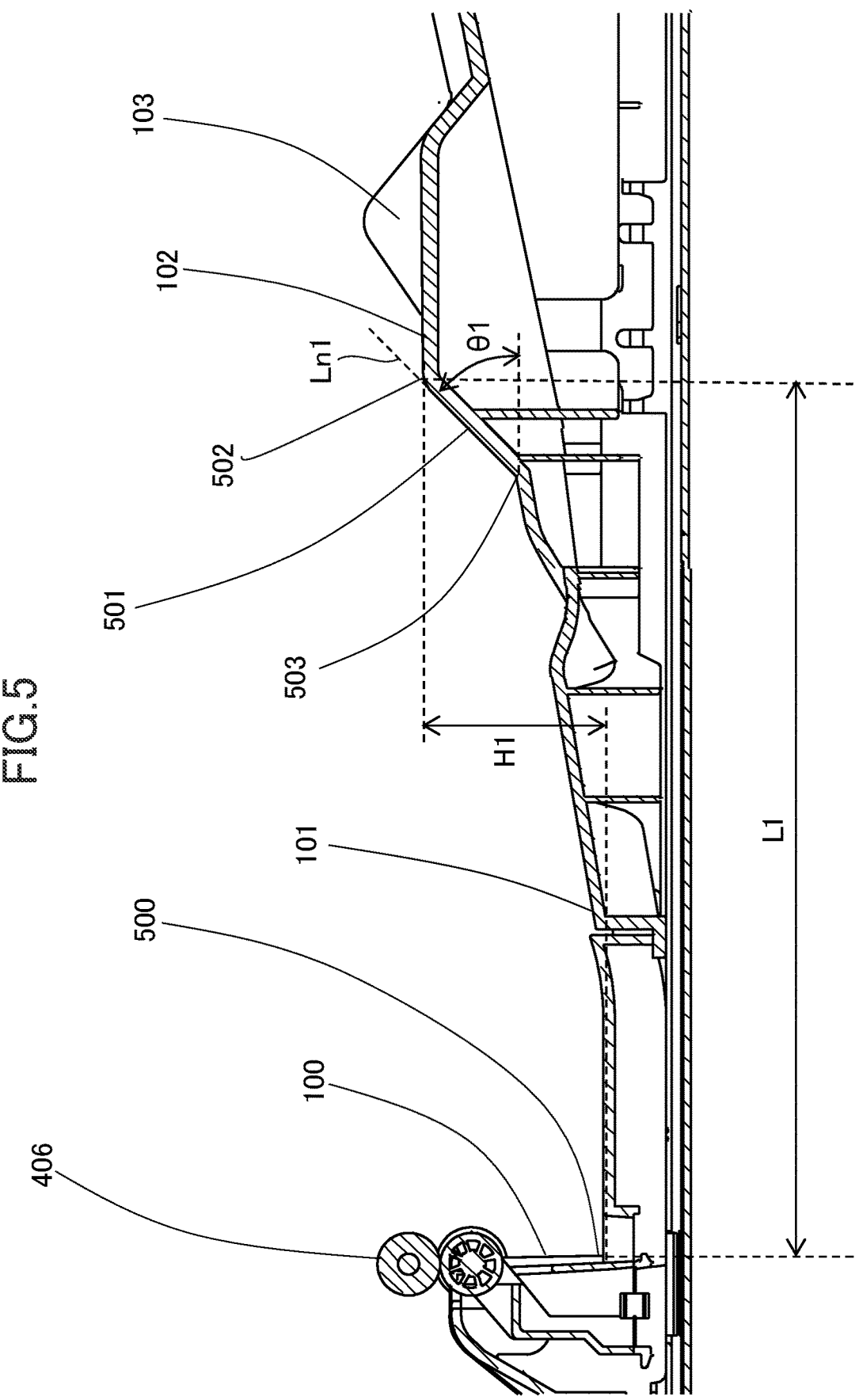
FIG. 5 is a section view of a discharge tray according to the exemplary embodiment.
Figure 6:
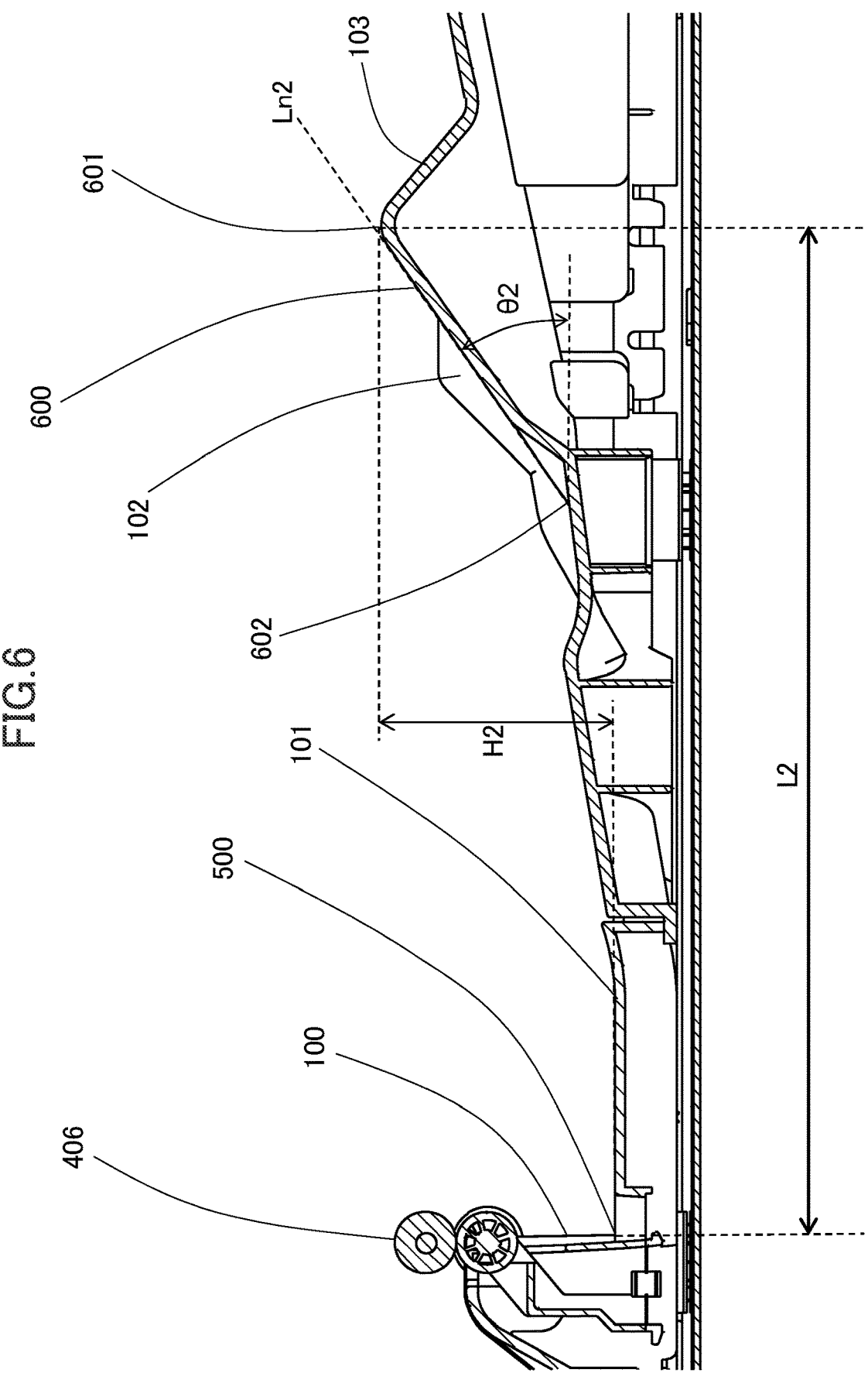
FIG. 6 is a section view of the discharge tray according to the exemplary embodiment.
Figure 7:
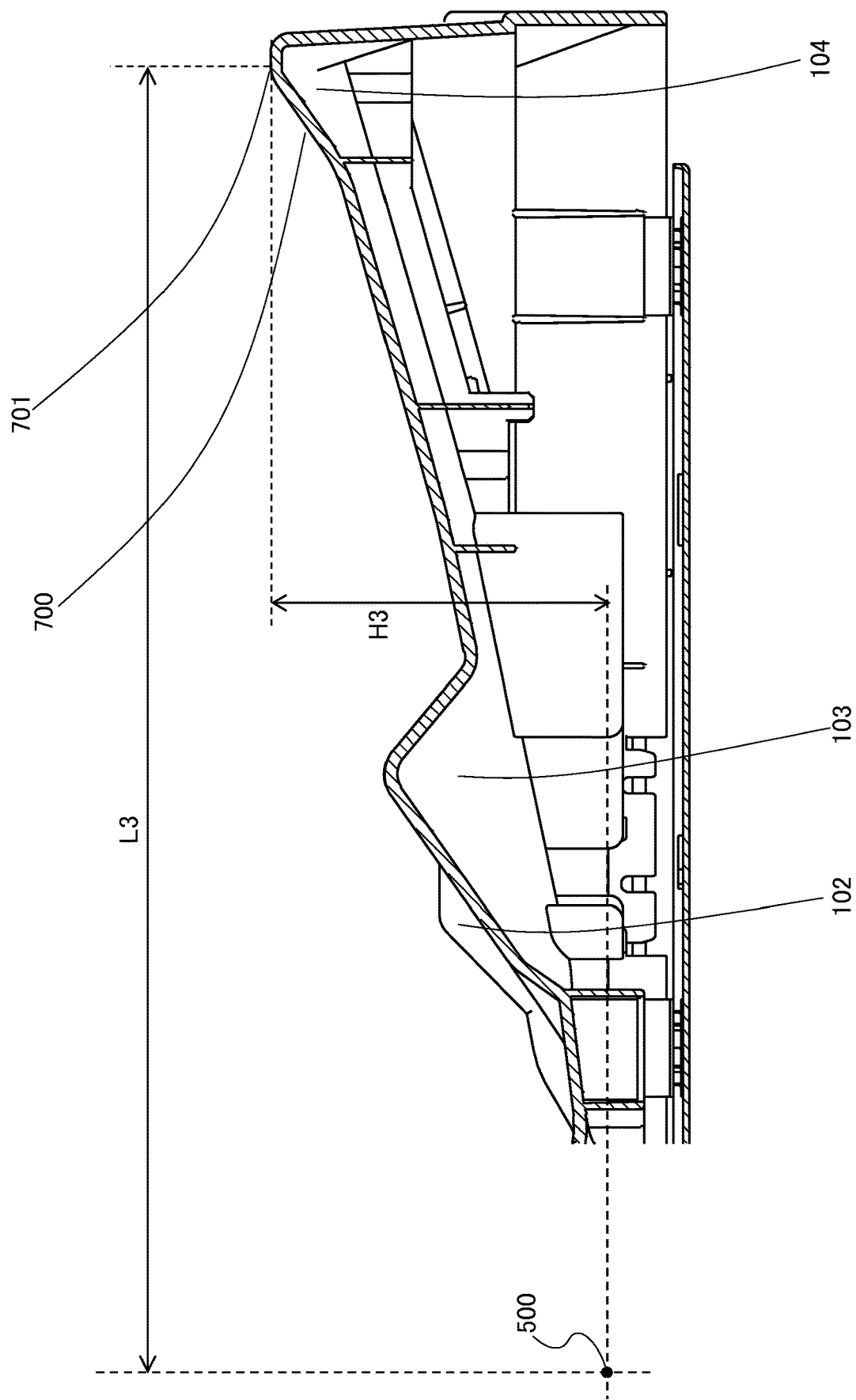
FIG. 7 is a section view of the discharge tray according to the exemplary embodiment.

Shapes of projections 102, 103, and 104 corresponding to the first supporting portion, second supporting portions, and third supporting portions of the present exemplary embodiment will be described in detail below with reference to FIGS. 5 to 7.

First, positions of points and the like for specifying the shape of the first projection 102 as viewed in the Y direction are defined as follows with reference to FIG. 5.

A point where the wall surface portion 100 and the upstream supporting surface 101 intersect is defined as a first intersection point 500.

A surface constituting an upstream surface of the first projection 102 in the discharge direction of documents and inclined upward toward the downstream side in the discharge direction is defined as a first inclined surface 501.

The highest point of the first inclined surface 501 in the Z direction, that is, a downstream end of the first inclined surface 501 in the discharge direction, is defined as a first vertex 502.

A point where the first inclined surface 501 and the upstream supporting surface 101 intersect is defined as a third intersection point 503.

A straight line connecting the third intersection point 503 and the first vertex 502 is defined as a first straight line Ln1.

A distance from the first intersection point 500 to the first vertex 502 in the X direction is defined as L1 [mm].

A distance from the first intersection point 500 to the first vertex 502 in the Z direction is defined as H1 [mm].

An angle of the first straight line Ln1 with respect to the X direction is defined as θ1 [deg].

Here, in the case where the upstream surface and the downstream surface of the first projection 102 do not intersect with each other with an angle therebetween but are smoothly connected to each other via a curved surface, the first intersection point 500, the third intersection point 503, and the first vertex 502 are virtual points where extension lines of the upstream surface and the downstream surface intersect. This also applies to points for specifying the shapes of the second projections 103 and the third projections 104 that will be described below.

In addition, in the present exemplary embodiment, since the first inclined surface 501 is constituted by a single flat surface, the first inclined surface 501 coincides with the first straight line Ln1. However, it should be noted that, in the case where the first inclined surface 501 is a curved surface or made up of a combination of a plurality of flat surfaces, the first inclined surface 501 does not coincide with the first straight line Ln1. This also applies to second inclined surfaces 600 of the second projections 103 and second straight lines Ln2 that will be described later.

Positions of points and the like for specifying the shape of each of the second projections 103 as viewed in the Y direction are defined as follows with reference to FIG. 6.

A surface constituting an upstream surface of the second projection 103 in the discharge direction of documents and inclined upward toward the downstream side in the discharge direction is defined as a second inclined surface 600.

The highest point of the second inclined surface 600, that is, a downstream end of the second inclined surface 600 in the discharge direction, is defined as a second vertex 601.

A point where the second inclined surface 600 and the upstream supporting surface 101 intersect is defined as a fourth intersection point 602.

A straight line connecting the fourth intersection point 602 and the second vertex 601 is defined as a second straight line Ln2.

A distance from the first intersection point 500 to the second vertex 601 in the X direction is defined as L2 [mm].

A distance from the first intersection point 500 to the second vertex 601 in the Z direction is defined as H2 [mm].

An angle of the second straight line Ln2 with respect to the X direction is defined as θ2 [deg].

As described above, these intersection points and highest points may be virtual points. In addition, in the present exemplary embodiment, although the second inclined surface 600 coincides with the second straight line Ln2 because the second inclined surface 600 is a single flat surface, the second inclined surface 600 may be a curved surface or a combination of a plurality of flat surfaces, and in this case, the second inclined surface 600 does not coincide with the second straight line Ln2.

Positions of points and the like for specifying the shape of each of the third projections 104 as viewed in the Y direction are defined as follows with reference to FIG. 7.

A surface constituting an upstream surface of the third projection 104 in the discharge direction of documents and inclined upward toward the downstream side in the discharge direction is defined as a third inclined surface 700.

The highest point of the third inclined surface 700, that is, a downstream end of the third inclined surface 700 in the discharge direction, is defined as a third vertex 701.

A distance from the first intersection point 500 to the third vertex 701 in the X direction is defined as L3 [mm].

A distance from the first intersection point 500 to the third vertex 701 in the Z direction is defined as H3 [mm].

As described above, these intersection points and highest points may be virtual points.

Figure 8:
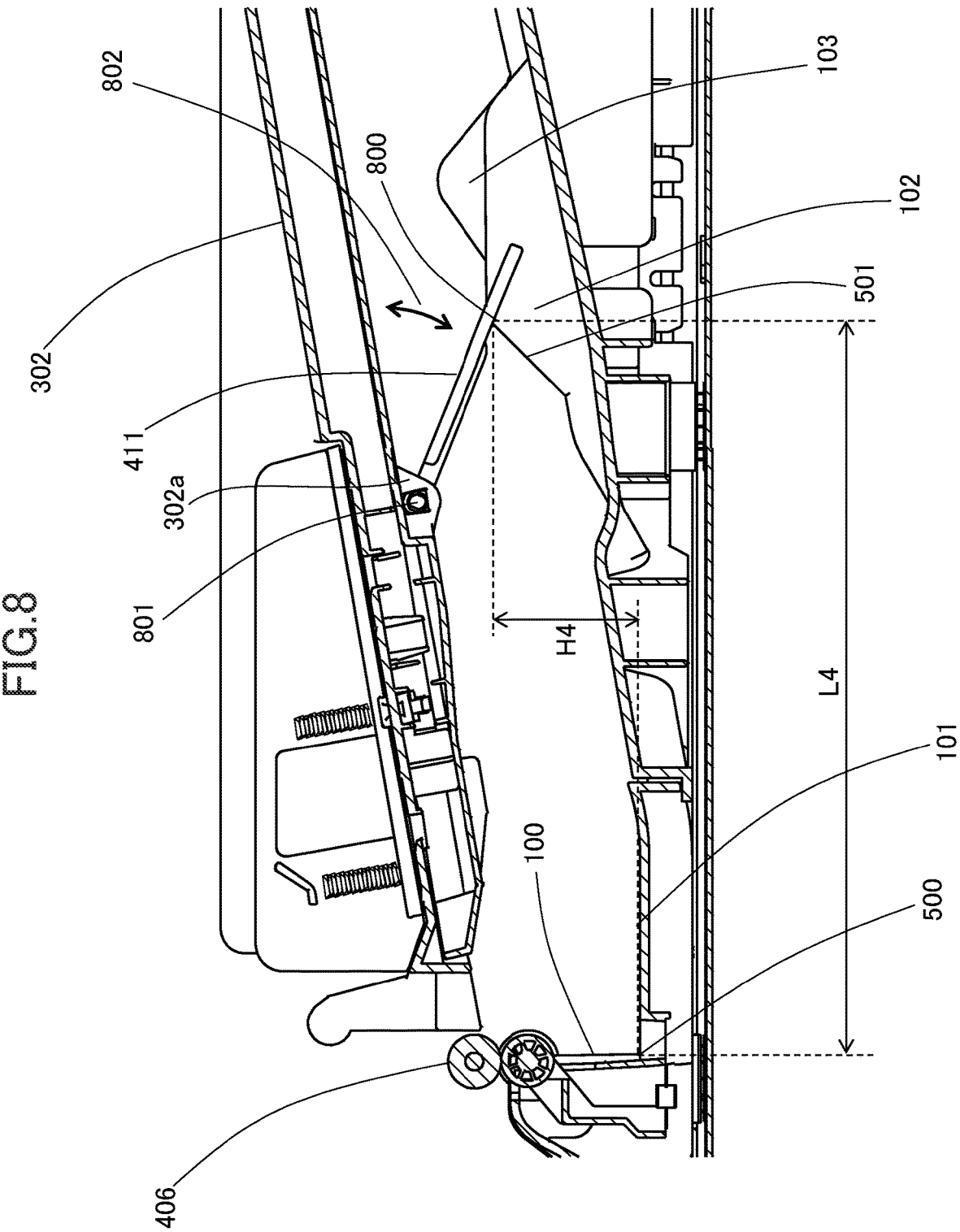
FIG. 8 is a section view of the discharge tray and a swing guide according to the exemplary embodiment.

Next, the position of the swing guide 411 will be described with reference to FIG. 8. FIG. 8 illustrates a state in which the swing guide 411 is not pushed by a document discharged onto the discharge tray 303. That is, the swing guide 411 is positioned at a lower limit position in a movable range thereof in a swing direction 802 about the swing shaft 801. In this state, the distal end portions of the swing guide 411 overlap with the first projection 102 as viewed in the Y direction. More specifically, an upstream surface of the swing guide 411 in the discharge direction intersects with the first inclined surface 501, which is an upstream surface of the first projection 102 in the discharge direction.

Positions of points and the like for specifying the shape of the swing guide 411 as viewed in the Y direction are defined as follows.

A point where the first inclined surface 501 and the swing guide 411 intersect is defined as a second intersection point 800.

A distance from the first intersection point 500 to the second intersection point 800 in the X direction is defined as L4 [mm].

A distance from the first intersection point 500 to the second intersection point 800 in the Z direction is defined as H4 [mm].

Further, the shape of the discharge tray 303 according to the present exemplary embodiment is configured such that the values L1 to L4, H1 to H4, θ1, and θ2 related to the first projection 102, the second projections 103, the third projections 104, and the swing guide 411 satisfy the following relationships.

$$L1<L2<L3 \tag{1}$$

$$L4<L2 \tag{2}$$

$$H1<H2<H3 \tag{3}$$

$$H4<H2 \tag{4}$$

Relationship (1) indicates that the first vertex 502 of the first projection 102, the second vertices 601 of the second projections 103, and the third vertices 701 of the third projections 104 are arranged in this order from the upstream side to the downstream side in the discharge direction of documents. Relationship (3) indicates that the first vertex 502 of the first projection 102, the second vertices 601 of the second projections 103, and the third vertices 701 of the third projections 104 are arranged in this order from the lower side to the higher side in the gravity direction.

Relationship (2) indicates that the second intersection point 800 where the swing guide 411 and the first inclined surface 501 intersect is positioned upstream of the second vertices 601 of the second projections 103 in the discharge direction. Relationship (4) indicates that the second intersection point 800 is positioned lower than the second vertices 601 of the second projections 103 in the gravity direction. As described above, since L4<L2 and H4<H2 are satisfied, the discharge space above the discharge tray 303 is blocked by the swing guide 411 in a state in which the swing guide 411 is not pushed up by a document as illustrated in FIG. 8. In other words, the downstream side in the discharge direction of the space defined between the discharge tray 303 and the feed tray 302 in the gravity direction as viewed in the Y direction is closed by the first inclined surface 501 of the first projection 102 and the swing guide 411.

Length of Document in Conveyance Direction and Dimensions of Discharge Tray

The ADF 300 of the present exemplary embodiment is configured to be capable of handling at least three document sizes having different lengths in the conveyance direction. In the description below, among representative document sizes that can be handled by the ADF 300, a size having a small length in the conveyance direction will be referred to as a first size, a size having a medium length in the conveyance direction will be referred to as a second size, and a size having a large length in the conveyance direction will be referred to as a third size. For example, the first size is A6R having a length of 148 mm in the conveyance direction and a width of 105 mm. For example, the second size is A5R having a length of 210 mm in the conveyance direction and a width of 148 mm. For example, the third size is A4R having a length of 297 mm in the conveyance direction and a width of 210 mm. To be noted, A6R, A5R, A4R are merely examples, and may be changed to document sizes assumed to be frequently used.

(A) Arrangement of Document of First Size and First Projection

The first projection 102 of the discharge tray 303 is provided at a position corresponding to a document of the first size. That is, the first projection 102 is disposed so as to come into contact with a leading end of a document in the discharge direction on the first inclined surface 501 in a state in which a trailing end of the document has been released from the discharge roller pair 406 in the case where a document of the first size is discharged. In the case where A6R is assumed as the first size, the first vertex 502 of the first projection 102 is preferably disposed such that L1 [mm] and H1 [mm] satisfy 148≤L1<180 and 20≤H1<40.

In addition, the swing guide 411 is disposed such that a space in which documents of the first size can be stacked is secured on the upstream side in the discharge direction in a state in which the swing guide 411 is not pushed up and overlaps with the first projection 102 as viewed in the Y direction. For example, the swing guide 411 is preferably disposed such that L4 [mm] and H4 [mm] defining the position of the second intersection point 800 satisfy L1=L4 and H1=H4. To be noted, in the case where A6R is assumed as the first size, even if L4 or H4 is not equal to L1 or H1, the swing guide 411 is preferably disposed such that 148≤L4<180 and 20≤H4<40 are satisfied.

Figure 9:
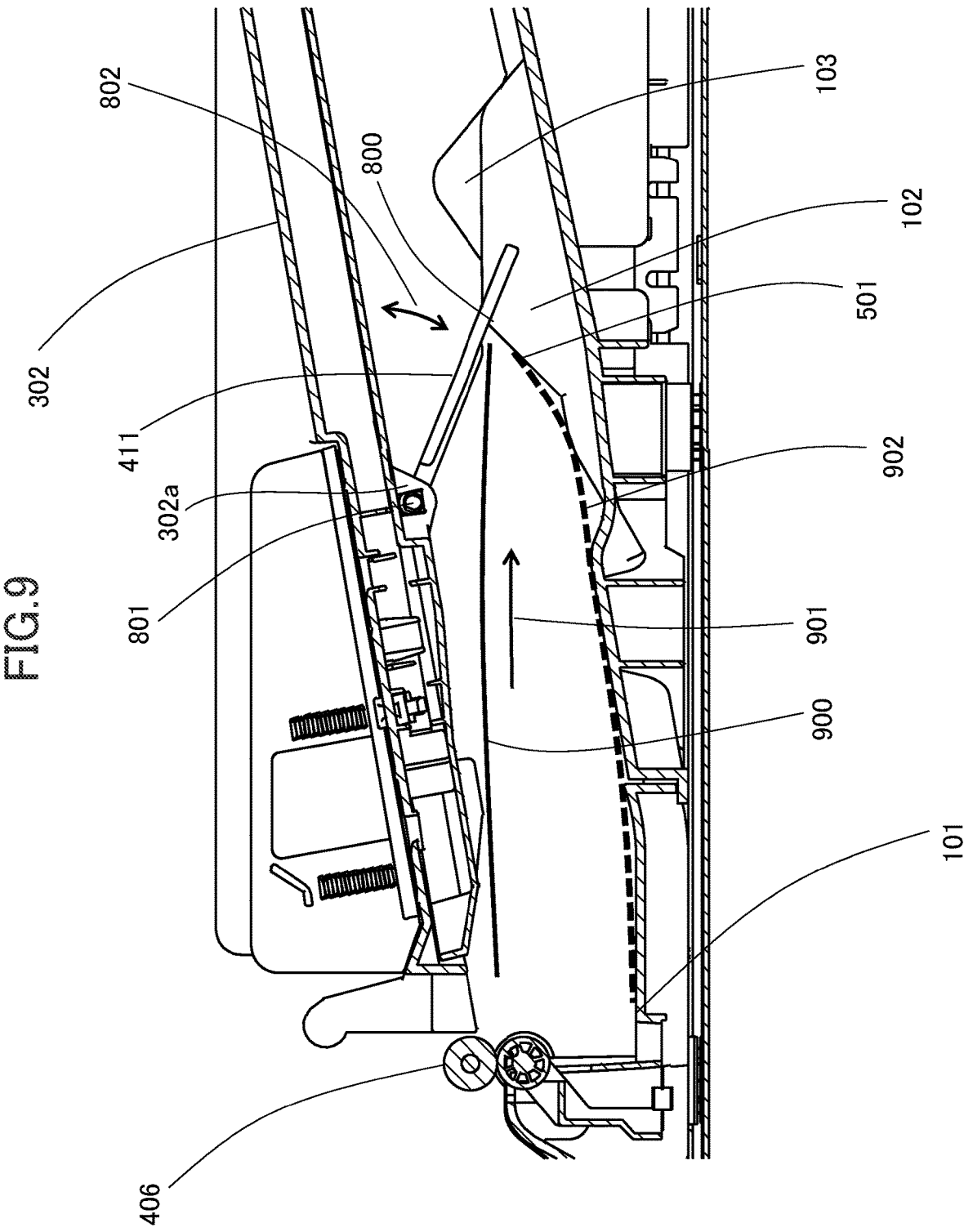
FIG. 9 is a section view of the discharge tray of the exemplary embodiment illustrating a state in which a document of a first size is supported on the discharge tray.

In the case where the first projection 102 and the swing guide 411 are disposed as described above, the position of a first-size document 900 discharged onto the discharge tray 303 is regulated by the first inclined surface 501 of the first projection 102 and the swing guide 411 as illustrated in FIG. 9. That is, the first-size document 900 comes into contact with the first inclined surface 501 or the swing guide 411 on a leading end thereof in a state in which a trailing end thereof in the discharge tray has been released from the discharge roller pair 406. At this time, the swing guide 411 resists an inertia force 901 of the document 900 and basically does not swing to a position above the first projection 102 even when the swing guide 411 comes into contact with the document 900 not nipped by the discharge roller pair 406. Therefore, downstream movement of the first-size document 900 beyond the second intersection point 800 in the discharge direction is hindered by the swing guide 411 and the first projection 102. As a result, the first-size document 900 is supported on the upstream supporting surface 101 and the first inclined surface 501 in a state in which the position thereof in the discharge direction is regulated within a region upstream of the second intersection point 800 in the discharge direction as indicated by a broken line 902 in FIG. 9, and therefore good alignment can be achieved.

(B) Document of Second Size and Arrangement of Second Projections

Figure 10:
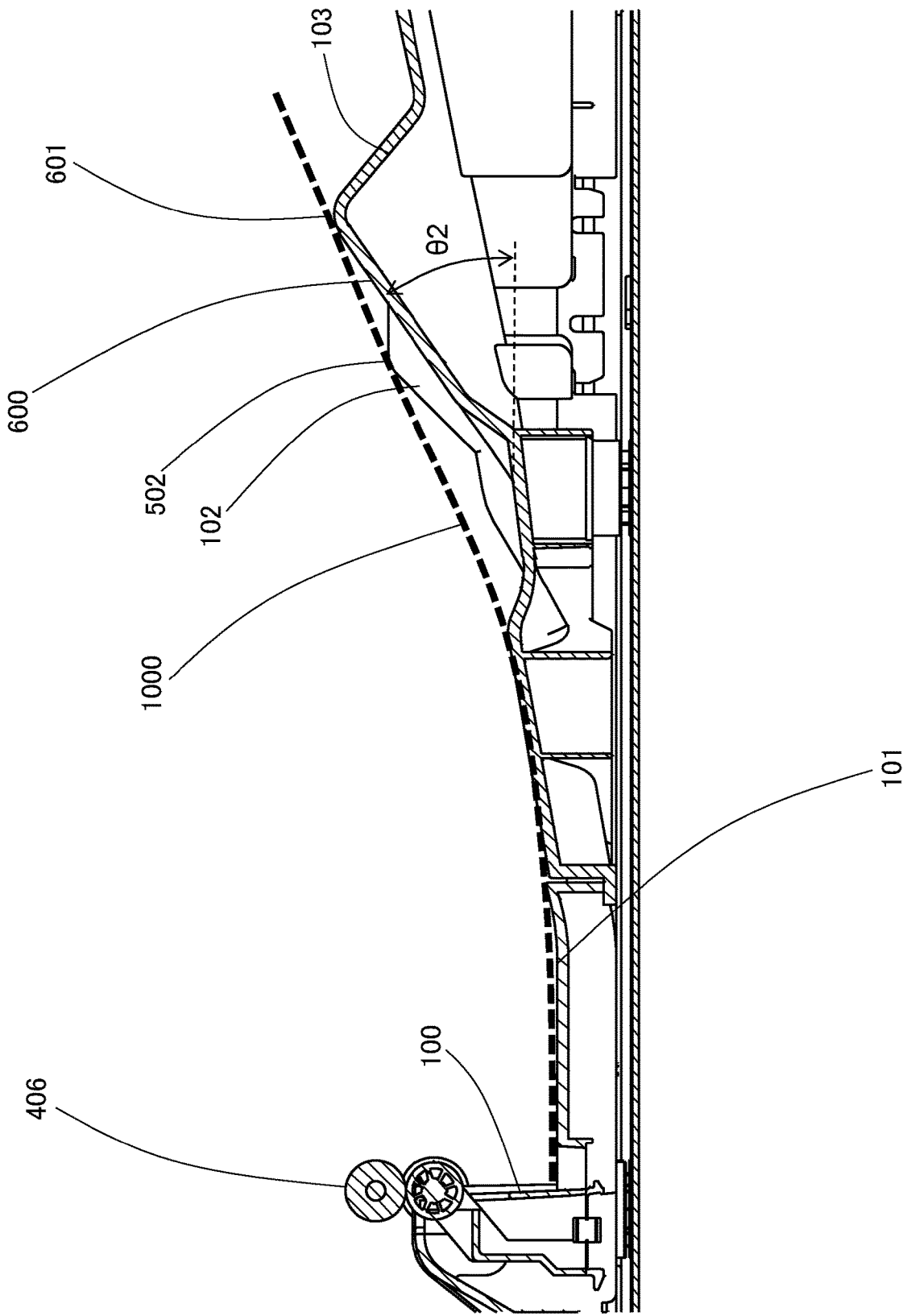
FIG. 10 is a section view of the discharge tray of the exemplary embodiment illustrating a state in which a document of a second size is supported on the discharge tray.

The second projections 103 are provided at positions corresponding to a document of the second size. That is, the second projections 103 are disposed at such positions that a leading end portion of the document of the second size in the discharge direction can be supported by the second inclined surfaces 600. In other words, the second projections 103 are disposed such that at least part of the second inclined surfaces 600 faces a lower surface of the document as viewed in the Y direction in a state in which a trailing end of the document of the second size discharged onto the discharge tray 303 is abutting the wall surface portion 100 as illustrated in FIG. 10. In the case where A5R is assumed as the second size, the second vertices 601 of the second projections 103 are preferably disposed such that L2 [mm] and H2 [mm] satisfy 180≤L2<240 and 40≤H2<60.

In the case where the second projections 103 are disposed as described above, the position of a second-size document 1000 disposed onto the discharge tray 303 is regulated by the combination of the swing guide 411, the first projection 102, and the second projections 103 as illustrated in FIG. 10. That is, the second-size document 1000 is discharged while pushing up the swing guide 411 in a state of being nipped by the discharge roller pair 406, and the leading end portion thereof moves in contact with the second inclined surfaces 600 of the second projections 103. The second vertices 601 of the second projections 103 are positioned downstream of the first vertex 502 of the first projection 102 in the discharge direction and higher than the first vertex 502 in the gravity direction, and therefore the document 1000 forms an inclined surface shape connecting the first vertex 502 and the second vertices 601.

Here, in a state before the first document 1000 is discharged, the space above the discharge tray 303 is blocked by the first projection 102 and the swing guide 411. Therefore, the first document 1000 is conveyed while pushing up the swing guide 411 and receiving a frictional drag from the swing guide 411 and the first projection 102. Therefore, even in the case where the conveyance speed of the document 1000 by the discharge roller pair 406 is higher than 340 mm/s, movement of the document 1000 to a position far away from the wall surface portion 100 by an inertia force can be suppressed.

In the case of discharging the second and subsequent documents 1000, since the swing guide 411 has already swung to a position higher than the first projection 102, the influence of the frictional force from the swing guide 411 and the first projection 102 is relatively smaller. Meanwhile, the document 1000 being discharged does not move to a position far away from the wall surface portion 100 because the document 1000 is discharged while being pushed up along the inclined surface shape formed by the already-discharged document 1000. As described above, the position of the second-size document 1000 in the discharge direction is regulated by the swing guide 411, the first projection 102, and the second projections 103 regardless of in which ordinal number the document 1000 is discharged, and therefore good alignment is achieved.

To be noted, the angle $\theta2$ formed between the second straight line Ln2 and the horizontal direction is preferably smaller than the angle $\theta1$ formed between the first straight line Ln1 and the horizontal direction, that is, $\theta2<\theta1$ is preferably satisfied. As a result of this, the reaction force that the document 1000 receives when the leading end of the document 1000 comes into contact with the second inclined surfaces 600 projecting to a higher position than the first vertex 502 of the first projection 102 can be attenuated, and thus troubles such as bending or stacking failure of the document 1000 caused as a result of the document 1000 being caught can be suppressed.

Examples of preferable numerical ranges of the angle $\theta1°$ formed between the first straight line Ln1 and the horizontal direction and the angle $\theta2$ formed between the second straight line Ln2 and the horizontal direction are $40\leq\theta1\leq55$, $25\leq\theta2\leq40$, and $\theta1-\theta2\geq5$. When $25\leq\theta2\leq40$ and $\theta1-\theta2\geq5$ are satisfied, the document 1000 being caught by the second inclined surfaces 600 can be effectively suppressed. In addition, when $40\leq\theta1\leq55$ is satisfied, the effect of the first inclined surface 501 regulating the position of the first-size document 900 as described in (A) above can be enhanced.

(C) Document of Third Size and Arrangement of Third Projections

The third projections 104 are provided at positions corresponding to a document of a third size. That is, the third projections 104 are disposed at such positions that the third inclined surfaces 700 can support a leading end portion of a document of the third size in the discharge direction. In the case where A4R is assumed as the third size, the third vertices 701 of the third projections 104 are preferably disposed such that L3 [mm] and H3 [mm] satisfy 240≤L3≤360 and 60≤H3<80.

Figure 11:
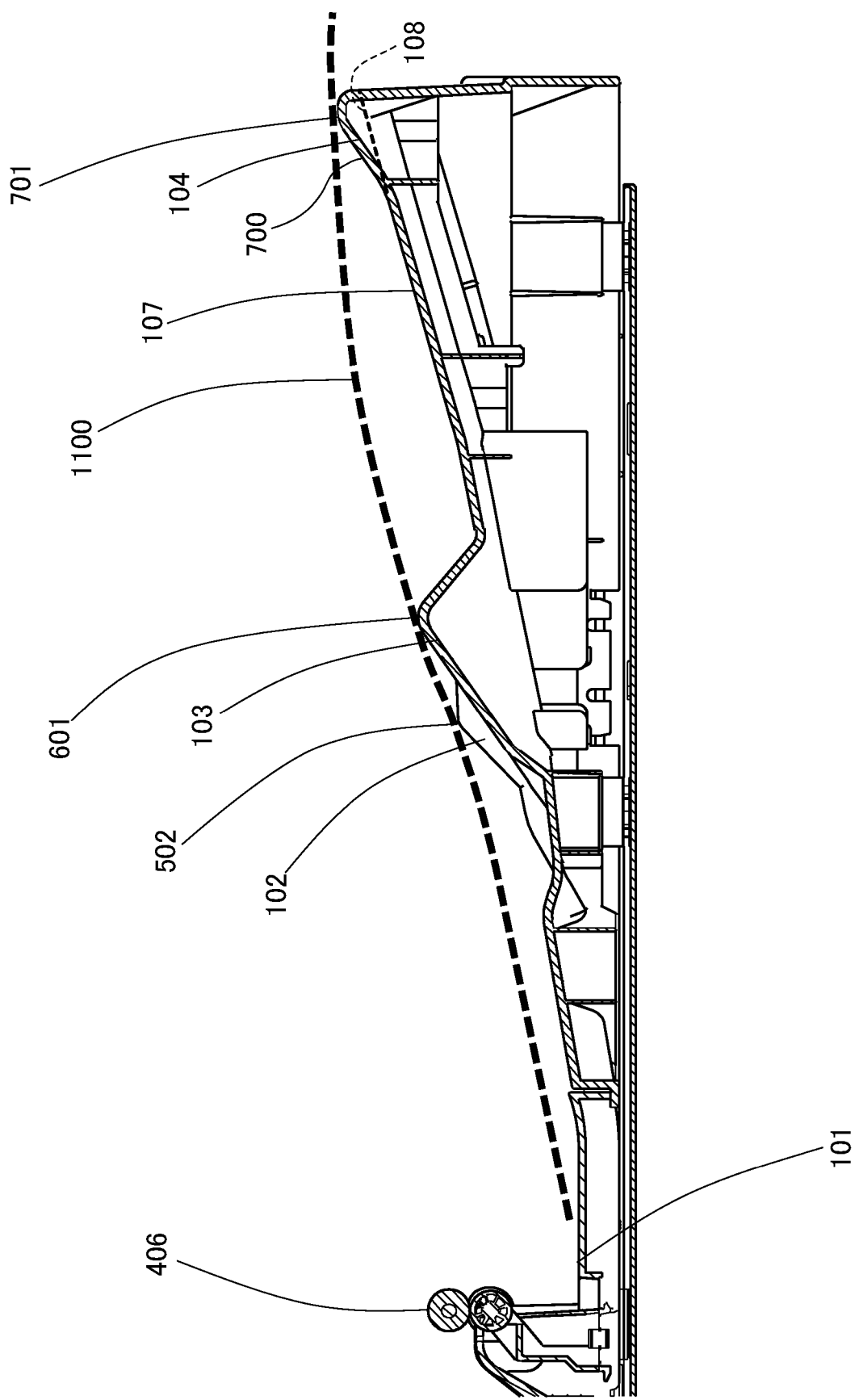
FIG. 11 is a section view of the discharge tray of the exemplary embodiment illustrating a state in which a document of a third size is supported on the discharge tray.

In the case where the third projections 104 are disposed as described above, the position of a third-size document 1100 discharged onto the discharge tray 303 is regulated by the cooperation of the swing guide 411, the first projection 102, the second projections 103, and the third projections 104 as illustrated in FIG. 11. That is, the third-size document 1100 is discharged while pushing up the swing guide 411 in a state of being nipped by the discharge roller pair 406, and the leading end portion thereof comes into contact with the second inclined surfaces 600 and then moves in contact with the third inclined surfaces 700. Then, a lower surface of the document 1100 is supported by the first vertex 502 of the first projection 102, the second vertices 601 of the second projections 103, and the third vertices 701 of the third projections 104. Since the third vertices 701 are positioned downstream of the second vertices 601 in the discharge direction and higher than the second vertices 601 in the gravity direction, the document 1100 forms an inclined surface shape smoothly connecting the first vertex 502, the second vertices 601, and the third vertices 701.

Here, in a state before the first document 1100 is discharged, the space above the discharge tray 303 is blocked by the first projection 102 and the swing guide 411. Therefore, the first document 1100 is conveyed while pushing up the swing guide 411 and receiving a frictional drag from the swing guide 411 and the first projection 102. Therefore, even in the case where the conveyance speed of the document 1100 by the discharge roller pair 406 is higher than 340 mm/s, movement of the document 1100 to a position far away from the wall surface portion 100 by an inertia force can be suppressed.

In the case of discharging the second and subsequent documents 1100, since the swing guide 411 has already swung to a position higher than the first projection 102, the influence of the frictional force from the swing guide 411 and the first projection 102 is relatively smaller. Meanwhile, the document 1100 being discharged does not move to a position far away from the wall surface portion 100 because the document 1100 is discharged while being pushed up along the inclined surface shape formed by the already-discharged document 1100. As described above, the position of the third-size document 1100 in the discharge direction is regulated by the swing guide 411, the first projection 102, the second projections 103, and the third projections 104 regardless of in which ordinal number the document 1100 is discharged, and therefore good alignment is achieved.

As described above, the discharge tray 303 of the present exemplary embodiment is configured such that L1<L2, L4<L2, H1<H2, and H4<H2 are satisfied for the swing guide 411, the first projection 102, and the second projections 103. As a result of this, as described in (A) and (B) above, good alignment of first-size and second-size documents in the discharge direction can be maintained. In particular, good alignment of the first-size and second-size documents can be achieved even in the case where the conveyance speed of documents is set to a value higher than 340 mm/s, for example, 400 mm/s or higher, for improving the productivity.

Further, in the present exemplary embodiment, the third projections 104 are provided on the discharge tray 303 such that L2<L3 and H2<H3 are satisfied. As a result of this, as described in (C) above, good alignment of documents of the third size can be maintained in the discharge direction in addition to the documents of the first size and the second size.

To be noted, the third projections 104 serving as third supporting portions of the present exemplary embodiment have shapes projecting to higher positions than upper surfaces 107 of the ribs extending downstream from the second projections 103 in the discharge direction. However, the third projections 104 may be omitted and surfaces 108 which are extensions of the upper surfaces 107 and inclined upward toward the downstream side in the discharge direction may be provided. These surfaces 108 serve as third supporting portions that support the lower surface of a third-size document at a position downstream of the second vertices 601 in the discharge direction and higher than the second vertices 601 in the gravity direction.

Other Embodiments

In the exemplary embodiment described above, the first projection 102, the second projections 103, and the third projections 104 are all formed as rib-like projections extending in the discharge direction. However, each supporting portion may be formed as a surface also extending in the Y direction as long as the supporting portion functions as the first supporting portion, the second supporting portion, or the third supporting portion. For example, a surface having the same outline as the second projections 103 as viewed in the Y direction may be formed on the entirety of the discharge tray 303 in the Y direction, and the first projection 102 may be formed to project from a predetermined position in the Y direction on this surface. In addition, for example, a rib-like projection may be used instead of the upstream supporting surface 101 having a planar shape as the upstream supporting portion to support a sheet.

In addition, although the discharge tray 303 capable of supporting at least three documents having different lengths in the discharge direction has been described in the exemplary embodiment described above, as a matter of course, the discharge tray may be formed to support documents of a wider variety in size. For example, an extension tray 109 housed in the discharge tray 303 may be pulled out to the downstream side in the discharge direction in FIG. 1 such that a document of a fourth size longer than the third size in the conveyance direction can be supported. For example, the fourth size is an LGL size having a length of 355.6 mm in the conveyance direction. In this case, the downstream end of the extension tray 109 having been pulled out in the discharge direction is preferably higher than the third vertices 701 of the third projections 104.

In addition, although a case where the technique of the present disclosure is applied to a sheet discharge configuration of an ADF has been described in the exemplary embodiment described above, the technique of the present disclosure is also applicable to sheet discharging apparatuses other than ADFs, for example, an apparatus that discharges a recording material on which an image has been already formed by an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102798, filed on May 31, 2019, which is hereby incorporated by reference herein in its entirety.

What is claimed is:

1. A sheet discharging apparatus, comprising:
a discharge unit configured to discharge a sheet in a discharge direction;
a stacking portion on which the sheet discharged by the discharge unit is stacked; and
a swing member configured to swing around a swing shaft,
wherein the stacking portion includes
a first portion including a first surface that is provided on an upper portion of the first portion and is inclined upward toward a downstream side in the discharge direction, the first portion being configured to support the sheet at the first surface,
a second portion arranged separately from the first portion in a sheet width direction orthogonal to the discharge direction, the second portion including a second surface that is provided on an upper portion of the second portion and is inclined upward toward the downstream side in the discharge direction, the second portion being configured to support the sheet at the second surface,
a bottom surface portion arranged between the first portion and the second portion in the sheet width direction, the bottom surface portion being lower than both the first surface and the second surface,
a moving member configured to be moved in the discharge direction with respect to the first portion and the second portion and to support the sheet discharged by the discharge unit, the moving member being arranged between the first portion and the second portion in the sheet width direction, the moving member being movable to a position downstream of the first surface and the second surface in the discharge direction,
wherein the swing shaft is positioned above the first surface and the second surface,
wherein the swing member is configured to be at a position where the swing member overlaps both the first portion and the second portion when viewed in the sheet width direction in a case where the swing member is not in contact with the sheet discharged by the discharge unit, and is configured to be moved from the position in a case where the swing member is pushed by the sheet discharged by the discharge unit, and
wherein the swing member is arranged such that a lower end of the swing member remains separated from the bottom surface portion of the stacking portion.

2. The sheet discharging apparatus according to claim 1,
wherein the first portion includes a first connecting surface which connects the bottom surface portion and the first surface and which spreads in a gravity direction and in the discharge direction,
wherein the second portion includes a second connecting surface which connects the bottom surface portion and the second surface and which spreads in the gravity direction and in the discharge direction, and wherein both the swing member and the moving member are arranged between the first connecting surface and the second connecting surface in the sheet width direction.

3. The sheet discharging apparatus according to claim 1,
wherein the stacking portion includes a projecting portion projected upward and configured to support the sheet,
wherein the projecting portion is positioned downstream of the first surface and the second surface in the discharge direction,
wherein an upper surface of the projecting portion is projected further upward than both the first surface and the second surface, and
wherein a position of the projecting portion in the sheet width direction is different from a position of the moving member in the sheet width direction.

4. The sheet discharging apparatus according to claim 1,
wherein the stacking portion includes a projecting portion projected upward and configured to support the sheet,
wherein the projecting portion is positioned downstream of the first surface and the second surface in the discharge direction,
wherein an upper surface of the projecting portion is projected further upward than both the first surface and the second surface, and
wherein the moving member is movable to a position where at least a portion of an upper surface of the moving member is higher than the upper surface of the projecting portion.

5. The sheet discharging apparatus according to claim 1,
wherein the swing member is arranged between the first portion and the second portion in the sheet width direction.

6. An image reading apparatus comprising:
an image reading unit configured to read an image of a sheet;
a conveyance portion configured to convey the sheet to a reading position at which the image reading unit reads the image of the sheet; and
the sheet discharging apparatus according to claim 1.

7. The image reading apparatus according to claim 6, further comprising:
a feed tray on which the sheet to be conveyed by the conveyance portion is supported,
wherein the swing shaft is supported by the feed tray.

8. An image forming apparatus comprising:
an image forming unit configured to form an image on a recording medium; and
the image reading apparatus according to claim 6.

9. An image reading apparatus comprising:
a tray on which a sheet is supported;
a feeding unit configured to feed the sheet supported on the tray;
an image reading unit configured to read an image of the sheet fed by the feeding unit;
a discharge unit configured to discharge the sheet whose image has been read by the image reading unit in a discharge direction;
a stacking portion on which the sheet discharged by the discharge unit is stacked; and
a swing member supported by the tray and configured be moved in a case where the swing member is pushed by the sheet discharged by the discharge unit,
wherein the stacking portion includes
a bottom surface portion,
a first portion including a first surface that is provided on an upper portion of the first portion and is inclined upward toward a downstream side in the discharge direction, the first portion being higher than the bottom surface portion and configured to support the sheet at the first surface, and a moving member configured to support the sheet discharged by the discharge unit, the moving member being arranged such that a position of the moving member in a sheet width direction orthogonal to the discharge direction overlaps a position of the swing member in the sheet width direction, the moving member being configured to be pulled out in the discharge direction, wherein the moving member is movable to a position downstream of the first surface in the discharge direction, wherein the swing member overlaps the first surface of the first portion when viewed in the sheet width direction in a case where the swing member is not in contact with the sheet discharged by the discharge unit, and wherein the swing member is arranged such that a lower end of the swing member remains separated from the bottom surface portion of the stacking portion.

10. The image reading apparatus according to claim 9, wherein the stacking portion includes a second portion including a second surface on which the sheet is supported, the second surface being provided on an upper portion of the second portion and inclined upward toward the downstream side in the discharge direction.

11. The image reading apparatus according to claim 10, wherein the second surface of the second portion is positioned downstream of the first surface of the first portion in the discharge direction, and wherein the moving member is movable to a position in the discharge direction overlapping a position of the second surface in the discharge direction.

12. The image reading apparatus according to claim 9, wherein the stacking portion includes a second portion arranged separately from the first portion in a sheet width direction orthogonal to the discharge direction, the second portion including a second surface that is provided on an upper portion of the second portion and is inclined upward toward the downstream side in the discharge direction, the second portion being configured to support the sheet at the second surface.

13. The image reading apparatus according to claim 12, wherein both the swing member and the moving member are arranged between the first portion and the second portion in the sheet width direction.

14. The image reading apparatus according to claim 9, further comprising:

a curved conveyance path into which the sheet fed by the feeding unit is conveyed in a direction opposite to the discharge direction, wherein the discharge unit is configured to convey the sheet in the discharge direction to discharge the sheet from the curved conveyance path.

15. The image reading apparatus according to claim 9, wherein the discharge unit is arranged below the tray.

16. The image reading apparatus according to claim 9, wherein at least a portion of the moving member having been pulled out in the discharge direction is higher than the first surface.

17. The image reading apparatus according to claim 9, wherein the stacking portion includes a projecting portion projected upward and configured to support the sheet discharged by the discharge unit, wherein the projecting portion is positioned downstream of the first surface in the discharge direction, and wherein at least a portion of the moving member having been pulled out in the discharge direction is higher than the projecting portion and is positioned downstream of the projecting portion in the discharge direction.

18. The image reading apparatus according to claim 9, wherein the first portion includes a first connecting surface which connects the bottom surface portion and the first surface and which spreads in a gravity direction and in the discharge direction.

19. An image forming apparatus comprising:

an image forming unit configured to form an image on a recording medium;

a tray on which a sheet to be fed is supported;

a feeding unit configured to feed the sheet supported on the tray;

an image reading unit configured to read an image of the sheet fed by the feeding unit;

a discharge unit configured to discharge the sheet whose image has been read by the image reading unit in a discharge direction;

a stacking portion on which the sheet discharged by the discharge unit is stacked; and a swing member supported by the tray and configured be moved in a case where the swing member is pushed by the sheet discharged by the discharge unit, wherein the stacking portion includes a bottom surface portion, a first portion including a first surface that is provided on an upper portion of the first portion and is inclined upward toward a downstream side in the discharge direction, the first portion being higher than the bottom surface portion and configured to support the sheet at the first surface, and a moving member configured to support the sheet discharged by the discharge unit, the moving member being arranged such that a position of the moving member in a sheet width direction orthogonal to the discharge direction overlaps a position of the swing member in the sheet width direction, the moving member being configured to be pulled out in the discharge direction, wherein the moving member is movable to a position downstream of the first surface in the discharge direction, wherein the swing member overlaps the first surface of the first portion when viewed in the sheet width direction in a case where the swing member is not in contact with the sheet discharged by the discharge unit, and wherein the swing member is arranged such that a lower end of the swing member remains separated from the bottom surface portion of the stacking portion.

20. The image forming apparatus according to claim 19, further comprising:

an apparatus body in which the image forming unit is provided; and a second tray which is provided on a side portion of the apparatus body in the discharge direction and on which the recording medium for forming the image thereon is supported.

* * * * *